(12) United States Patent
Weber

(10) Patent No.: US 9,824,041 B2
(45) Date of Patent: Nov. 21, 2017

(54) DUAL ACCESS MEMORY MAPPED DATA STRUCTURE MEMORY

(71) Applicant: DataDirect Networks, Inc., Chatsworth, CA (US)

(72) Inventor: Bret S Weber, Wichita, KS (US)

(73) Assignee: DATADIRECT NETWORKS, INC., Chatsworth, CA (US)

( * ) Notice: Subject to any disclaimer, the term of this patent is extended or adjusted under 35 U.S.C. 154(b) by 424 days.

(21) Appl. No.: 14/563,507

(22) Filed: Dec. 8, 2014

(65) Prior Publication Data

US 2016/0162422 A1 Jun. 9, 2016

(51) Int. Cl.
*G06F 13/28* (2006.01)
*G06F 12/0897* (2016.01)
*G06F 13/40* (2006.01)

(52) U.S. Cl.
CPC .......... *G06F 13/28* (2013.01); *G06F 12/0897* (2013.01); *G06F 13/4027* (2013.01); *G06F 2212/22* (2013.01); *G06F 2212/262* (2013.01); *G06F 2212/604* (2013.01)

(58) Field of Classification Search
CPC .. G06F 12/0897; G06F 13/28; G06F 13/4027; G06F 2212/22; G06F 2212/604; G06F 2212/262
See application file for complete search history.

(56) References Cited

U.S. PATENT DOCUMENTS

| | | | |
|---|---|---|---|
| 5,761,705 A | 6/1998 | DeKoning et al. | |
| 6,073,218 A * | 6/2000 | DeKoning | G06F 9/52 |
| | | | 710/20 |
| 6,917,990 B2 | 7/2005 | Henry et al. | |
| 6,944,712 B2 | 9/2005 | Weber et al. | |
| 7,043,622 B2 | 5/2006 | Henry et al. | |
| 7,818,461 B2 | 10/2010 | Weber | |
| 8,006,128 B2 | 8/2011 | Olster | |
| 8,086,794 B2 | 12/2011 | Fellinger et al. | |
| 8,122,177 B1 | 2/2012 | Puranik | |
| 8,250,401 B2 | 8/2012 | Olster | |
| 2002/0062409 A1* | 5/2002 | Lasserre | G06F 1/206 |
| | | | 710/22 |
| 2003/0200388 A1* | 10/2003 | Hetrick | G06F 12/0866 |
| | | | 711/114 |
| 2005/0050273 A1* | 3/2005 | Horn | G06F 3/061 |
| | | | 711/114 |
| 2006/0080515 A1* | 4/2006 | Spiers | G06F 11/1441 |
| | | | 711/162 |
| 2012/0311271 A1 | 12/2012 | Klein et al. | |
| 2013/0304968 A1* | 11/2013 | Benhase | G06F 12/0246 |
| | | | 711/103 |
| 2014/0115223 A1 | 4/2014 | Guddeti et al. | |
| 2014/0129753 A1 | 5/2014 | Schuette et al. | |

\* cited by examiner

*Primary Examiner* — Eric Oberly

(74) *Attorney, Agent, or Firm* — Russell T. Manning; Marsh Fischmann & Breyfogle LLP

(57) ABSTRACT

Systems and methods are provided for expanding the available memory of a storage controller. The systems and methods utilize a PCIe memory controller connected to the backend interface of the storage controller. Memory of the PCIe memory controller is memory mapped to controller memory of the storage controller. The PCIe connection allows the storage controller to access the memory of the PCIe memory controller with latencies similar to that of the controller memory.

20 Claims, 4 Drawing Sheets

DUAL ACCESS MEMORY MAPPED DATA STRUCTURE MEMORY

FIELD

The presented inventions are generally directed to handling Input/Output (I/O) requests of host systems at physical storage subsystems. More specifically, the presented inventions relate to utilization of cache connected to a backend interface of a storage controller wherein the cache has a dedicated memory for maintaining data structures for the location of data in the cache.

BACKGROUND

Large storage systems (e.g., enterprise level storage) typically include multiple individual storage devices (e.g., disk drives). The individual storage devices are accessed by host systems via Input/Output (I/O) requests, such as reading and writing, through one or more storage controllers. Examples of large storage systems include, without limitation, Redundant Array Of Independent Disks (RAID) storage systems that have one or more logical units (LUNs) distributed over a plurality of disks, and spanned volumes (e.g., non-RAID architecture; JBOD, etc.). Examples of the host systems include computing environments, ranging from individual personal computers and workstations to large networked enterprises encompassing numerous types of computing systems. A variety of well-known operating systems may be employed in such computing environments depending upon the needs of particular users and enterprises. Storage devices in such large storage systems may include standard hard disk drives as well as other types of storage devices such as solid-state drives (SSD), optical storage, semiconductor storage (e.g., Random Access Memory disks or RAM disks), tape storage, et cetera.

In any large storage system, a limiting feature in processing I/O requests is latency in accessing individual storage devices It will be appreciated that access speeds of many electronic storage components, such as SRAM, DRAM and solid state memory devices, continue to increase, often exponentially. The same has not tended to for mechanical storage components, such as those found in rotating storage media. For instance, seek latency of a rotating hard drive is limited by actuator arm speed and disk circumference, and throughput of such a rotating hard drive is limited by the rotational speed of the disk. Thus, access speeds of rotating storage media are considerably slower than access speeds of electronic storage components Nonetheless, as rotating storage media continues to be among the most economical storage solution for mass storage systems, it remains in extensive use.

To improve performance of storage systems utilizing rotating storage media, a number of large storage systems have begun to implement higher level caches of increasing size to allow preloading increased amounts of data into cache. In this regard, high demand data from the rotating storage media may be preloaded into the higher level cache(s). Upon receiving a read request for data, pre-loaded data may be retrieved free of accessing rotating media.

SUMMARY

Systems and methods (i.e., Utilities) are provided for expanding the available memory of a storage controller. The utilities utilize one or more memory controller(s) PCIe connected to the backend interface of at least two storage controllers. Memory of the backend memory controller is memory mapped to the controller memories of th storage controllers. The PCIe connection allows the storage controller to access the memory of the PCIe memory controller with latencies similar to that of the controller memory.

A first aspect of the presented inventions are based on the recognition that, while implementing higher level caches of increasing size allows increasing the volume of pre-loaded data, data structures identifying the location of data in the higher level caches must be maintained. Specifically, such data structures have previously been maintained in storage controller memory (e.g., DRAM) requiring that a portion of the storage controller memory be allocated for the higher level caches. If a higher level cache is formed of a plurality of Solid State Drives (SSDs), the number of drives and therefore the capacity of the higher level cache is thereby limited by the size of the controller memory, which may be limited by circuit board space. That is, if a higher level cache includes too much capacity (e.g., too many drives), the performance of the controller is compromised due to the amount of data structures maintained by the controller memory.

In the first aspect of the presented inventions, the backend memory controller is configured to store data structures of a second level cache. In this aspect, the ability to connect additional memory to the backend of the storage controllers allows for significantly increasing the available memory of the controllers permitting the storage of additional data structures without compromising the performance of the controllers In such an arrangement, the controllers may demote data from a first level cache to a second level cache (e.g., backend SSDs) and transfer data structures from main controller memory to the memory of the backend controller.

In another aspect, the backend memory or multiple backend memories may be utilized to store mirror copies of the data of I/O write requests. In such an arrangement, such I/O write request received by a first storage controller need not be mirrored to the second storage controller.

In further aspects, the use of a backend memory that is PCIe connected to two or more storage controllers and memory mapped to the main memories of the controller provides expandable memory. That is, controller memory may be expanded in proportion to the available backend interfaces of the controller. This memory may be utilized for any processing function.

Another aspect of the presented inventions is a dual interface backend memory controller. The dual interface memory controller may be PCIe connected to two storage controllers to provide access to backend memory by the two storage controllers. In a further arrangement, the dual interface backend memory controller includes non-volatile memory, a microcontroller/sequencer and a back-up power supply. In such an arrangement, the microcontroller/sequencer may be configured to transfer data from the memory (e.g., volatile memory) of the backend memory controller to the non-volatile memory upon power failure.

DETAILED DESCRIPTION

Figure 1:
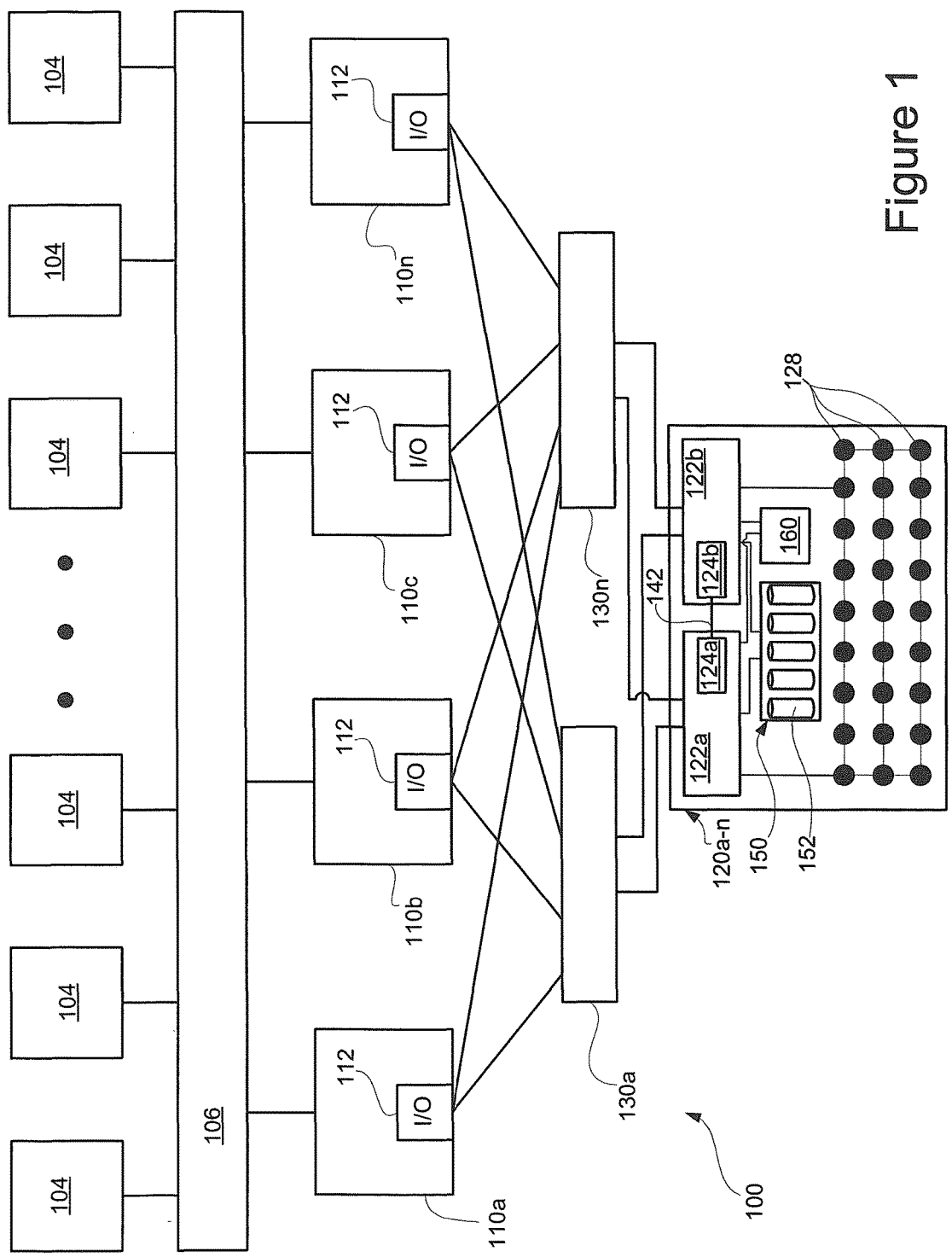
FIG. 1 is a block diagram illustrating a network implementing the storage subsystem in accordance with various aspects of the invention.

While the presented inventions are susceptible to various modifications and alternative forms, specific embodiments of the inventions have been shown, by way of example, in the drawings and will herein be described in detail. Those skilled in the art will appreciate that the features described below can be combined in various ways to form multiple variations of the inventions. As a result, the inventions are not limited to the specific examples described below, but only by the claims and their equivalents.

Provided herein is a storage subsystem that utilizes a second-level cache to improve Input/Output operations. In one arrangement, the storage subsystem includes dual controllers that are each operative to access a back-end memory controller that maintains data structures for a second level cache including a plurality backend electronic storage devices (e.g., SSDs). The back-end memory unit includes on-board memory (e.g., DRAM) that reduces the need to allocate controller memory for the second level cache. Among other benefits, the size/capacity of the second level cache may be greatly increased.

With reference now to the figures and in particular with reference to FIG. 1, an exemplary embodiment of a storage subsystem 120, in accordance with aspects of the presented inventions, is provided. As shown, a computing network 100 includes multiple servers/host systems 110a-n connected to multiple storage subsystems 120a-n (only one shown for clarity) via multiple switches 130a-n (hereafter 110, 120 and 130, respectively, unless specifically identified), where the switches collectively define a switching fabric. In other embodiments, the host systems or file system heads (e.g., systems that receive file level requests and generate block data requests) may be directly connected to the storage subsystems. In any embodiment, the host systems 110 are typically interconnected to a plurality of computing devices 104, for instance, via a high speed network 106. Such high speed networks may include, for example, the internet, a local area network (LAN), a wide area network (WAN), or any other suitable network communications channel. These devices can be any of a variety of computing devices including, for example, laptops, desktops, workstations, handheld/wireless computing devices, or other computing devices. Data migration between the storage subsystems 120 and the computing devices 104 is managed by the host systems 110. Details of the connections between the computing devices 104 and host systems 120 are known to those skilled in the art.

The storage subsystems 120 are configured for handling I/O requests from the host systems 110, which communicate with the computing devices 104. The host systems 110 may be communicatively connected to the storage subsystems 120 for processing I/O requests through a variety of connections. Examples of such connections include Fibre Channel (FC), Small Computer System Interface (SCSI), Internet SCSI (ISCSI), Ethernet, Infiniband, SCSI over Infiniband, piping, and/or various physical connections. A variety of well-known operating systems may be employed in such computing environments depending upon the needs of particular users and enterprises.

I/O modules 112 process I/O requests from the host systems 110 in order to access physical storage space within the storage subsystems 120. The I/O modules 112 have host connect interfaces for receiving I/O requests from the host systems and transferring data between the host systems 110 and the storage subsystems 120. The I/O modules 112 can connect to the host systems through a variety of means. Each I/O module is communicatively connected to the switching fabric through multiple communications switches, such as Application Specific Integrated Circuits (ASIC), configured to route data from a host system 110, through the switching fabric, and on to storage elements or devices of a storage subsystem according to a specific address. Those skilled in the art are familiar with communications switches and will readily recognize the design of such switches (e.g., custom ASICs) for purposes of transferring messages through such a switched fabric or other communication medium.

In the present embodiment, the I/O requests are transferred from the I/O modules 112 to storage devices of the storage subsystems 120 through the switches 130 of the switching fabric. Other connections are possible. Each of the storage subsystems 120 typically includes a plurality of individual storage devices 128, such as rotating media/disks and/or other types of storage devices (e.g., solid state drives, optical storage, tape storage, semiconductor storage) that may be arranged into one or more logical units (LUNs) and controlled by a controller and more typically at least a pair of redundant controllers 122a, 122b. The storage devices and storage controllers can be configured to employ any of a number of storage management schemes, such as, without limitation, JBOD or RAID systems (e.g., Raid 0, 3, 4, 5, 6 etc.). In a RAID system, the storage controllers may include RAID storage controllers for processing the requests of host systems 110 through I/O modules 112 and communication switches 130. However, the presented inventions are not limited to any storage management scheme of particular data replication scheme.

In the illustrated embodiment, the storage devices 128 can appear as a single virtual storage system to the host systems. In operation, any protocol for transferring data over a physical interface may be utilized to transfer I/O requests to the storage subsystem. For instance, SRP protocol over Infiniband, SCSI, RDMA Protocol, iSER over Infiniband, iSCSI, Fibre Channel over Ethernet (FCoE) and other protocols may be utilized. In the case of an SCSI based protocol, the I/O requests includes a Command Data Block (CDB) that contains information (e,g., Logical Unit Identifier (LUN) and offset or Logical Block Address (I-BA)) regarding the location of data in terms of the virtual storage system. This information is translated into a new I/O request relating to the physical location in the appropriate storage subsystem. Thus, mapping tables may be implemented for translating virtual storage locations of the virtual storage system into physical storage locations of the storage subsystems (i.e., storage locations of the individual storage devices). Data may then be written or retrieved from the storage devices by the controllers of the appropriate storage subsystem.

In the present embodiment, each of the controllers 122a, 122b is operatively connectable with each of the individual storage devices 128 to affect such read/write requests (all connections are not shown for purposes of clarity). The illustrated embodiment may also utilize redundant connections between each host system 110, switch 130, and storage subsystem 120 For example, a first host system 120a is interconnected to two fabric switches 130a, 130b, which are, in turn, each connected to each controller 122a, 122b of a storage subsystem 120a. In this regard, dual path architecture may be utilized to provide redundant paths between the host system 110a and the storage subsystem 120a. One of the features of such architecture is capability of failover; meaning that in case one path fails or a fabric switch 130a fails, data can be sent via the second fabric switch 130b. The number of host systems 110, storage subsystems 120, fabric switches 130 and I/O modules 112 forming the network 100 is not intended to be limited to the number of host systems 110, storage subsystems 120, fabric switches 130, and/or I/O modules 112 in the present embodiment.

Like the use of redundant connections, the use of the dual storage controllers 122a, 122b in each of the storage subsystems 120 can increase the availability of the storage subsystem in the case of control electronics failures (i.e., due to redundancy). In this arrangement, the pair of controllers 122a, 122b control the same storage devices 128, though prior to failure the storage devices may be partitioned between the controllers. Memories 124a, 124b of each of the controllers 122a, 122b may communicate for synchronization. In this regard, data from I/O requests may be mirrored in the memory of each controller. That is, if a first controller 122a receives an I/O request, data from the I/O request is stored in allocated memory blocks (e.g., primary cache) in the memory 124a of the first controller and mirrored (e.g., copied) to allocated memory blocks in the memory 124b of the second controller, for example, via an Inter-Controller Channel 142 (ICL) physically interconnecting the controllers 122a, 122b. In such an arrangement, if the first controller experiences a failure, the second controller may continue processing I/O requests while the first controller is repaired or replaced. The use of a backend memory controller (described below) can eliminate the need for mirroring between the controllers. That is, data can be mirrored in the memory of the backend memory controller rather than in a redundant storage controller.

The storage subsystem 120 also incorporates a second level cache 150 (e.g., read and/or write cache) for storing frequently accessed data from the storage devices 128 and/or for storing recently written I/O write requests, such that this information is available from the second level cache for future read requests. The second level cache 150, in the present embodiment, is formed of a plurality of Solid State Drives (SSDs) 152 connected to the backend interfaces of each of the controllers 122a, 122b. In this regard, the second level cache may be termed a flash cache. The second level cache 150 may be pre-loaded (e.g., pre-warmed) with frequently accessed data from the storage devices 128. When the second level cache 150 fills, it may be flushed utilizing least recently used (LRU) or similar staleness algorithms as known to those skilled in the art. It will be appreciated that the SSDs 152 of the second level cache 150 may be allocated in any manner between the controllers 122a, 122b.

The SSDs of the second level cache have access speeds slower than a RAM/DRAM based caches. However, the access speeds of the SSDs are still significantly greater than that of rotating media. More importantly, such a second level cache is scalable. That is, access through the backend of the controller(s) allows incorporation of a plurality of SSDs into the second level cache that greatly increases the potential size of the cache as it is not limited by, for example, space on a circuit board. While use of a second level cache connected through the backend of the controllers allows for expanding the size of the cache, data structures identifying the location of data in the second level cache must be maintained. Maintenance of such data structures in the storage controller memory 124 (e.g., DRAM) requires allocating a portion of the storage controller memory 124 for the second level cache data structures. Thus, the number of SSDs 152 and therefore the capacity of the second-level cache 150 is limited by the size of the controller memory 124, which may be limited by DRAM capacity and/or circuit, board space. In the latter regard, the number of Dual In-Line Memory Modules (DIMMs) that may be utilized is limited by the number of plug-ins available on the chipset/board. Stated otherwise, if a second level cache 150 is too large, the performance of the storage controller(s) 122 will be compromised due to the amount of data structures maintained by the controller memory 124.

In one embodiment, the presented systems utilizes a backend memory controller 160 to lessen the impact of a large backend second level cache on the storage controller memories. As shown, the backend memory controller 160 is, like the second level cache 150, connected to the controllers 122a, 122b through their backend interfaces. This backend memory controller provides additional memory 164 (e.g., DRAM) for storing data structures of data located in the second level cache 150. In another embodiment, the additional memory 164 of the backend memory controller 160 may be utilized as additional memory (e.g., DRAM) for the controller 122. In any case, this additional memory 164 is accessible by the controller(s) 122.

Figure 2:
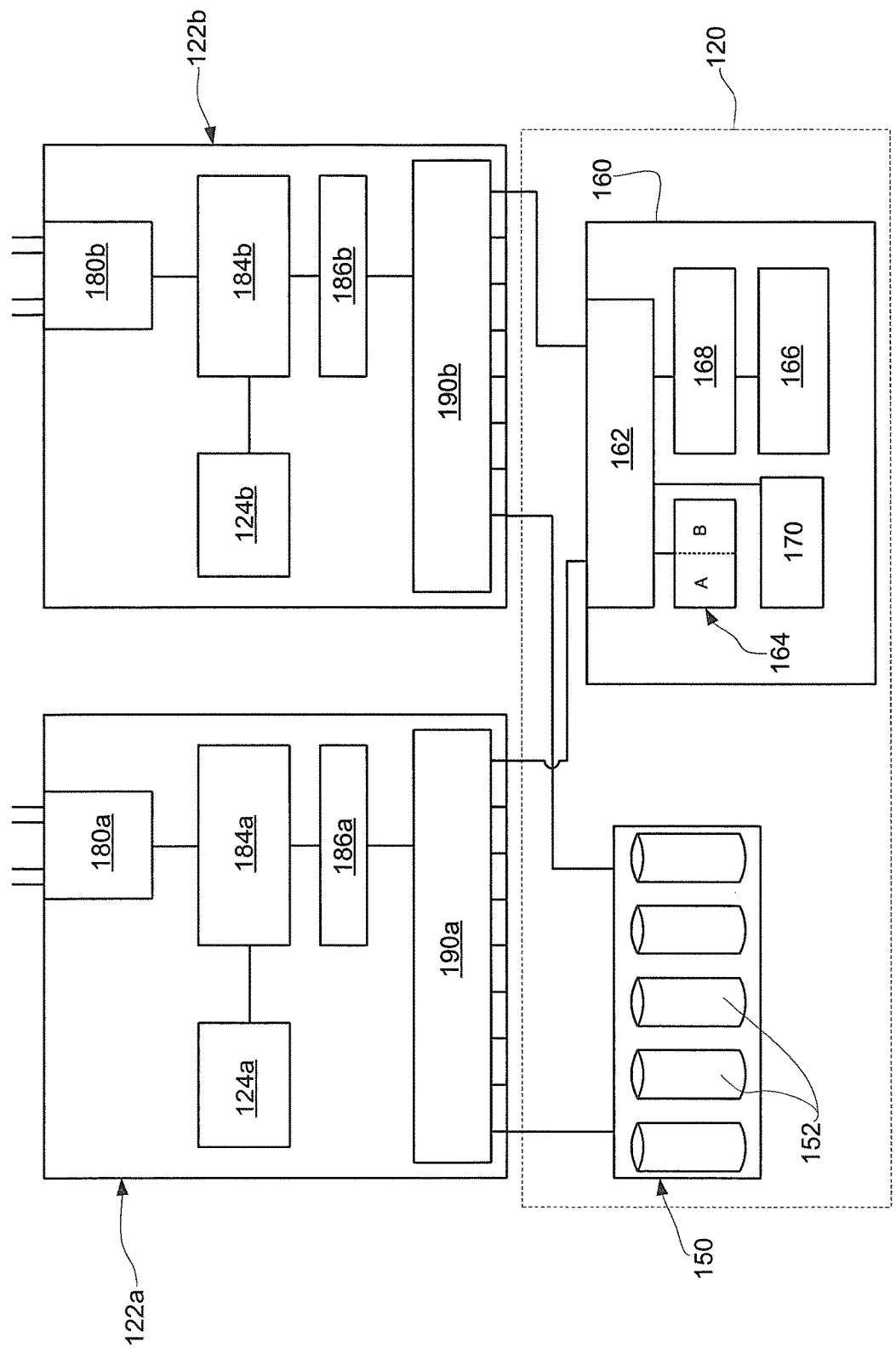
FIG. 2 is a block diagram illustrating an exemplary embodiment of a backend memory controller connected to the root complexes of two storage controllers.

FIG. 2 illustrates an exemplary embodiment of one of the controllers 122a, 122b (hereafter common components of the storage controllers are referred to without the 'a' and 'b' suffix unless specifically referenced), the backend cache 150 and the backend memory controller 160. The controllers 122 may include embedded firmware, software and/or hardware. As shown, the controllers each include a multi-ported host interface 180 or front-end interface that is capable of communicating with a host system, such as the host system 110 of FIG. 1, through a variety of means, including, without limitation, FC, SCSI ISCSI, SAS, PCIe, Ethernet, Infiniband, SCSI over Infiniband, piping, and/or various physical connections. Each controller further includes a processor/cpu 184, PCIe root complex 186 and memory 124 (e.g., DRAM). The PCIe root complexes 186 are operative to generate transaction requests on behalf of their respective processors, which are interconnected through a local bus. Though the root complexes 186 are shown as discrete devices, it will be appreciates that root complex functionality may be integrated with the processors. In any case, the root complexes may contain more than one PCIe port and multiple switch devices can be connected to ports on the root complex. The root complexes are typically responsible for configuring th PCIe bus at power-up.

The controllers 122a, 122b each include a backend interface 190a, 190b that provides access to the storage devices, the backend memory controller 160 and the second level cache 150. In the present embodiment, each backend interface 190 includes a plurality of connector slots (e.g., SFF-8639 PCIe slots). The connector slots are multifunction slots that allow for connection of either Serial Attached SCSI (SAS) devices or PCIe devices to the backend interface 190. The slots of the backend interface 190 are connected to the storage devices, backend memory controller 160 and second level cache 150 via direct connection or cabling (not shown). Such connections/cabling may include appropriate I/O modules as known to those skilled in the art. Typically, the storage devices 128 and the SSDs 152 of the second level cache 150 are external to the controller in an external subsystem (e.g., JBOD). However, the exact physical configurations may vary.

At least a portion of the slots are in direct communication with the PCIe root complexes 186 of the controllers 122. In one embodiment, the SSDs 152 of the second level cache 150 and the storage devices 128 may be connected by either SAS or PCIe connections. In contrast, the PCIe memory controller 160 utilizes a PCIe connection. Use of a PCIe connection between the memory controller 160 and the storage controller 122 provides an important benefit for the system. Specifically the latency of accessing memory 164 (e.g., DRAM) of the memory controller 160 via a PCIe connection is negligible. That is, the processor 184 of a storage controller 122 can access the additional memory 164 of the backend memory controller 160 at speeds substantially the same as accessing the storage controller memory 124. This allows, in addition to using them additional memory 164 of the backend memory controller to store data structures for a second level cache, the use of the additional memory 164 as expanded system memory. For example, the additional memory 164 of the backend memory controller may be used as a first level cache. That is, unlike accessing a drive connected to the backend interface that requires, for instance SCSI overhead protocol, accessing the additional memory 164 of the PCIe memory controller 160 can be performed using normal memory semantics (e.g., load/store operations).

As shown, the backend memory controller 160 is a PCIe memory controller having a dual interface 162 (e.g., dual PCIe interface), which allows connecting a single backend memory controller 160 to the root complexes 186 of both storage controllers 122. Stated otherwise, the backend memory controller 160 is sharable between the two root complexes. Thus, the memory 164 (e.g., DRAM) of the backend memory controller is accessible by either of the storage controllers 122. The memory 164 may be partitioned or allocated between the storage controllers 122. Alternatively, the memory 164 may be fully accessible by both controllers. Though termed a 'backend memory controller', it will be appreciated that the controller is typically without processing capabilities. That is, the backend memory controller is what may be termed 'dumb memory'. Stated otherwise, the backend memory controller is in its simplest form a PCIe memory device. In one embodiment, the memory 164 is utilized to store data structures of the data in the second level cache 150. In this embodiment, the memory 164 provides additional capacity (e.g., scratch pad memory) for storing data structures of the second level cache 150 thereby reducing the demand on the memories 124 of the controllers 122. In another embodiment, the memory 164 of the backend memory controller 160 is utilized as additional memory for the storage controller. In this embodiment, the backend memory may be utilized for any purpose including use a first level cache and/or for mirroring data of I/O request received by a controller 122.

In the illustrated embodiment, the backend memory controller 160 also incorporates a back-up system in the event of power failure. Specifically, the backend memory controller 160 further includes an on-board power source 166 (e.g., battery, capacitor etc) that activates upon power failure. The power source temporarily powers the components of the backend memory controller such that a microcontroller/sequencer 168 may sequence data out of the volatile memory 164 to a non-volatile back up memory 170. Other configurations for backing up data within the memory 164 of the backend memory controller 160 are possible and considered within the scope of the presented inventions.

In order to utilize the memory 164 of the backend memory controller 160 to store data structures identifying the location of data within the second level cache 150, th backend controller must be addressed to the controllers 122. To address a PCIe device such as the backend controller 160, it must be mapped into a system's I/O port address space or memory-mapped address space. In the present embodiment, the backend controller 160 is memory-mapped to each of the storage controllers 122a, 122b. In such a memory-mapping arrangement, allocated memory 164 of the backend controller 160 is addressed as part of the memory of the storage controller 122. For instance allocated part 'A' of the memory 164 of backend controller 160 may be memory-mapped with the memory 124a of the first storage controller 122a and allocated part 'B' of the memory 166 may be memory-mapped to the memory 124b of the second storage controller 122b. In any case, the main memory 124 is mapped in one area and the secondary/nackend memory 166 is mapped in another area.

Memory-mapping allows the use of the same address bus to address both the controller memory 124 and the memory 166 of the backend controller 160. Thus, the memory and registers of the backend controller 160 are mapped to (associated with) address space of the storage controller. To accommodate the backend controller, areas of the address space used by the backend storage controller must be reserved. When an address is accessed by the root complex 186, it may refer to a portion of controller memory 124 or it can refer to memory 164 of the backend controller 160. Thus, read/write instructions received by the root complex 186 can be used to directly access the controller memory 124 or directly access memory 164 of the backend controller 160. In the present embodiment, the storage controller's firmware, device drivers or the operating system program the Base Address Registers of the backend controller to inform the device of its address mapping. The backend memory controller 160 then monitors the address bus and responds to any access requests of an address assigned to the backend memory controller. This allows Direct Memory Access (DMA) to the backend memory controller. Thus, load and store operations can occur independently from the controller and controller memory resources are used during such operations.

One significant benefit of memory-mapping the backend memory controller 160 to the storage controller(s) 122 is that, because regular memory instructions are used to address the backend memory controller 160, all addressing modes are available for data transfer including normal memory semantics. That is, no SCSI protocols are required to access the backend memory controller 160 as is normally required for accessing storage drives connected to a backend of a storage controller, This eliminates the storage protocol overhead that result in increased latency times when accessing backend drives. Further, this allows for finer granularity of data transfers between the controller processor 184 and the memory 164 of the backend memory controller 160. The use of the PCIe connected backend memory controller 160 allows for byte addressable memory that may be accessed via, for example, load store ooperations. In contrast, typical backend storage devices (e.g., SSDs, rotating media etc.) require use of drive protocols (e.g., SCSI) that necessitate addressing storage block in 512 bytes or 4kB and multiples thereof.

In one arrangement, the backend memory controller 160 provides additional memory for the storage controller 122. In this arrangement, once a host interface 180 of one of the controllers 122 receives an I/O request to access a block of storage space within the storage devices, the processor 184 uses mapping tables to translate Command Data Block (CDB) into terms relating to the physical location in the storage subsystem. The processor 184 then directs data from the I/O request to the memory 124 of the controller or the memory 164 of the backend memory controller. In this embodiment, the memory 164 of the backend memory controller 160 is an extension of controller memory 124. In a further embodiment, the processor 184 directs data from the I/O request into the memory 124 of the controller 122 and directs a mirror copy to the memory 164 of the backend memory controller 160. In such an embodiment, once the back-up or mirror copy of a write request is stored in the memory 164 of the backend memory controller 160, a command complete signal may be provided to the requesting host. In this embodiment, if a first storage controller 122*a* stores a mirror copy of data of an I/O request in the memory 164 of the backend memory controller, no mirror copy need be made in the second storage controller 122*b*. In one embodiment, such data transfers may comprise Direct Memory Access (DMA) transfers where the data of the I/O request is stored to allocated memory blocks within a memory 124 or memory 164 independent of operation of the controller processor 184 after the data transfer s initiated.

In another arrangement, the backend memory controller 160 is used to store data structures for the second level cache 150. In this embodiment, the processor 184 of the storage controller 122 is operative to move data structures stored in the storage controller memory 124 to the memory 164 of the backend memory controller 160. That is, as data is demoted from the first level cache (e.g., L1 cache) of the controller memory 184, this data may be moved to the second level cache 150 (e.g., L2 cache) and the data structures for this data may be moved to the memory 164 of the backend memory controller 160.

In a case where an I/O read request is received by the storage controller 122, the processor 184 of the storage controller searches the storage memory 124 (e.g., L1 cache) to see if data structures associated with the I/O request are stored in the controller memory 124. If the data structures are not in the storage controller memory 124, the processor 184 searches the data structures of memory 164 of the backend memory controller 160 to determine if data structures of the requested data are stored in the backend memory controller 150. That is, the data structures in the backend controller memory 164 are searched for an associated address in the second level cache 150. If the processor 184 finds that an associated data structure in the memory 164 of the backend memory controller 160, a cache hit has occurred. In this case, the data may be read from the second level cache 150 into the storage controller memory 124. The dat may then be output to the requesting host system via the host interface 180.

The data in the second level cache 150 may be accessed in this regard, the chips of the backend interface 190 include a DMA controller and the processor 184 is operative to initiate the DMA transfer of the data from the second level cache 150 to the storage controller memory 124. More specifically, scatter gather lists are provided to the DMA controller, which retrieves the data and transfers it to the storage controller memory 124. Once the transfer is completed by the DMA controller, the processor 184 is notified and the processor 184 is operative, in one embodiment, to initiate a second DMA transfer using a DMA controller in the front-end host 180. The data in the storage controller memory 124 is then transferred via the front-end host 180 to the requesting host system.

As noted above, the backend controller of FIG. 2 includes a battery backup 166 and nonvolatile memory 170 that is operative to store the data (e.g., data structures, I/O write data, etc.) maintained in the backend controller memory 164 in the case of power failure. If one of the storage controllers 122*a* or 122*b* fails, the surviving storage controller is operative to map the entire memory space of the backend controller memory 164. This allows maintaining the data contained in the backend memory controller 160 in the event of a storage controller failure. In the case where the memory 164 of the backend memory controller 160 stores data structures for the second level cache 150, the ability to map the entire memory space allows continued access to the second level cache 150 in the event of a failure of a single storage controller. In the event that the backend controller 160 fails, the use of a single backend controller as shown in the embodiment of FIG. 2 results in the loss of the data in the memory 160. If the backend memory controller 160 stores data structures for the data for the second level cache 150, these data structures would be lost. In this embodiment, the single backend memory controller 160 represents a single point of failure and its failure results in the loss of the second level cache data structures requiring invalidation of the data in the second level cache 150. However, the data in the second level cache 150 also exists on the storage devices 128 of the storage subsystem. Accordingly, the second level cache 150 may be dumped and reloaded.

Figure 3:
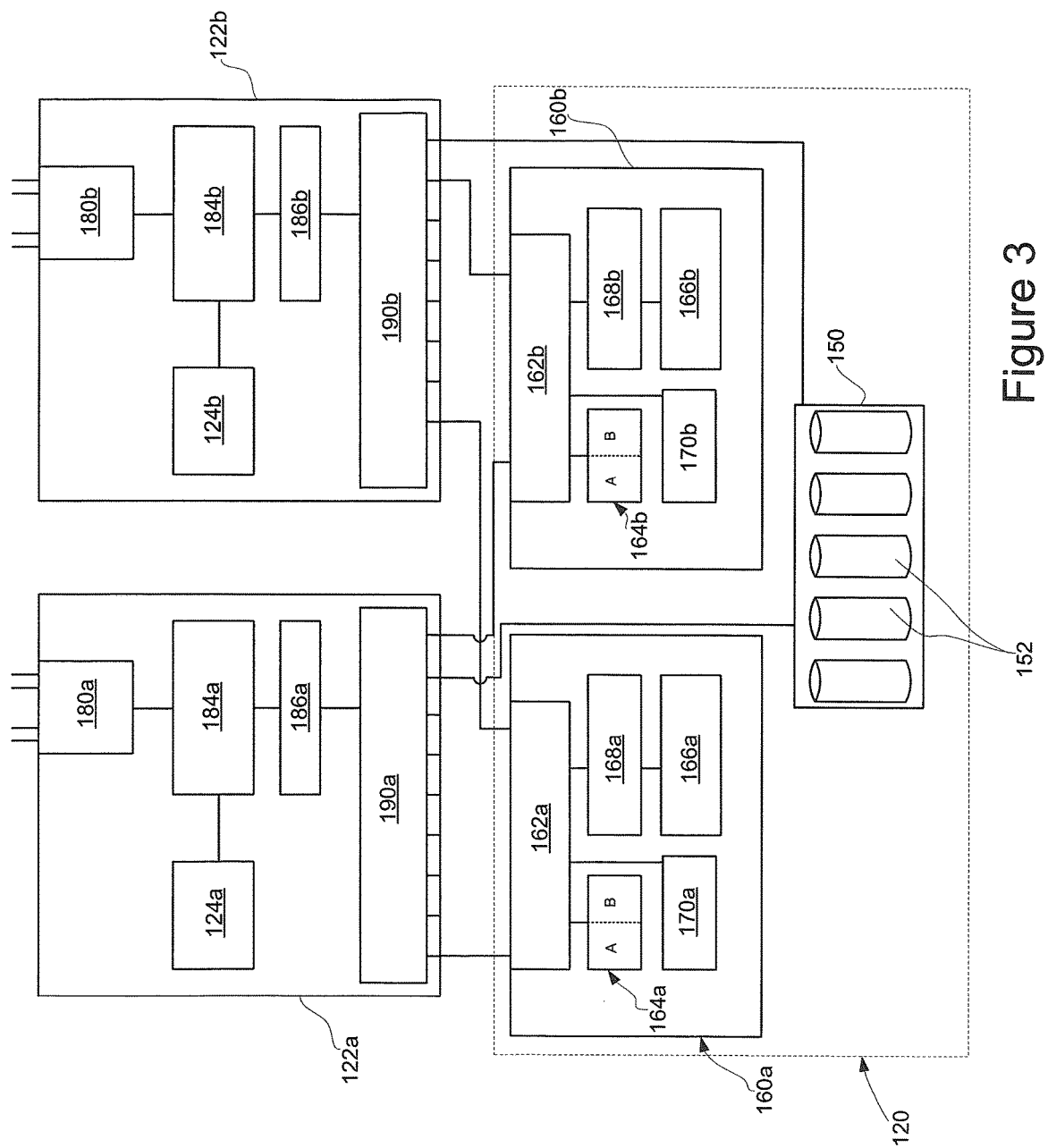
FIG. 3 is a block diagram illustrating an exemplary embodiment of two backend memory controllers connected to the root complexes of two storage controllers.

FIG. 3 illustrates a further embodiment of a storage system having a pair of redundant backend controllers 160*a*, 160*b* that maintain data structures and/or provide additional memory for the storage controllers 122*a*, 122*b*. In this arrangement, the memories 164*a*, 164*b* of the redundant backend memory controllers are each memory mapped to the memories 124*a*, 124*b* of the first and second controllers 122*a*, 122*b*. In this regard, duplicate copies of I/O requests arid/or data structures are stored by the redundant backend memory controllers 160*a*, 160*b*. That is, a storage controller 122 can write twice to each of the backend memory controllers 160*a*, 160*b* or an auto-mirroring process may be performed between the backend memory controllers. That is, a peer to per process may be performed by the backend memory controllers or a multicast operation may be performed by the processor where two write operationg are performed simultaneously. If one of the backend memory controllers fails, no data is lost. That is, use of the redundant backend memory controllers provides fail over protection. Additionally, the use of multiple backend memory controllers 160 allows for further expanding the size of the storage controller memory 124. For instance, each backend memory controller may be used as additional first level cache. Of note, enterprise level storage systems can have numerous PCIe slots. For instance, various embodiments of the storage controllers of the SFA family of storage systems produced by Data Direct Networks of 2929 Patrick Henry Drive, Santa Clara, Calif. 95054 can have 72 backend interfaces of which 48 are PCIe slots. As will be appreciated, numerous backend memory controllers may be incorporated into such systems. In this regard, one or more backend memory controllers may provide additional memory for the storage controller while one or more additional backend memory controller are used to store data structures for a second level cache.

Figure 4:
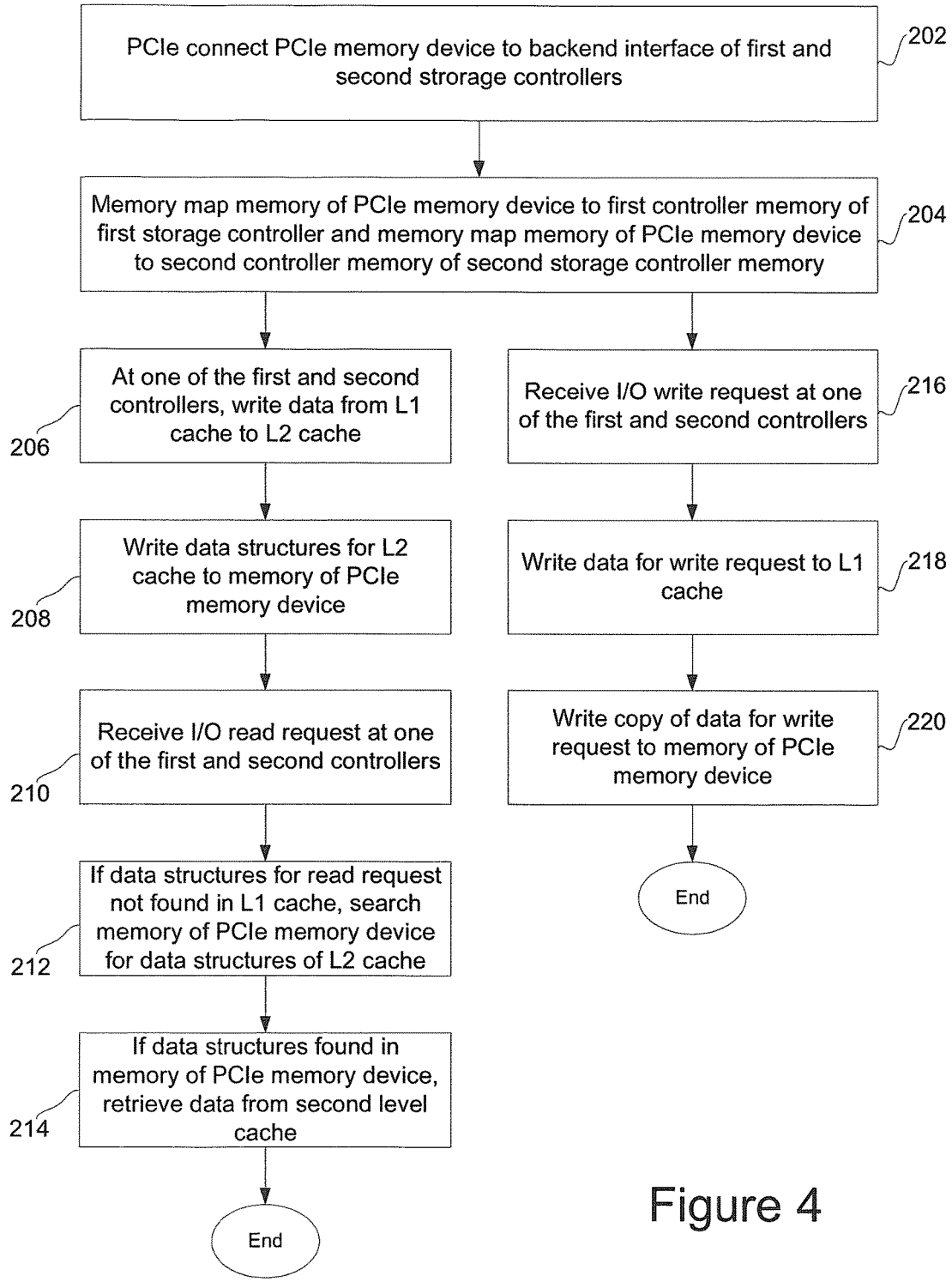
FIG. 4 illustrates two non-limiting processing implemented utilizing a backend memory controller connected to the root complexes of two storage controllers.

FIG. 4 illustrates two processes that may be implemented utilizing a backend memory controller. As shown, the processes 200 each include the PCIe connection 202 of one or more PCIe memory controllers/devices to the backend interfaces of first and second storage controllers. Once connected, a memory of the PCIe memory device is memory mapped 204 to the memories of each PCIe connected storage controller. use case, the PCIe memory device is used to store data structures of a second level (e.g., L2) cache. In this sub-process, each storage controller is operative to demote data from a first level cache (e.g., L1 cache) to the second level cache, which may be formed of SSDs connected to the backend interfaces of the storage controllers. That is, as data is flushed from the first level cache it is written 206 to a second level cache. In conjunction with writing data to the second level cache, data structures for the data as stored in the second level cache are written 208 to the memory of the PCIe memory device. As noted above, this reduces the demands on the storage controller memory and allows for expanding the size of the second level cache. Once the data structures are written to the second level cache, upon one of the storage controllers receiving 210 an I/O read request, the data structures stored in the memory of the PCIe memory device may be searched 212 if the data structures are not found in the first level cache of the receiving storage controller. If data structures for the I/O read request are identified in the memory of the PCIe memory device, the data may be retrieved 214 from the second level cache.

In a second sub-process, the memory of the PCIe memory device may be utilized to store mirror copies of I/O write requests. In this process, one of the storage controllers receives 216 a write request. The storage controller writes data 218 for the write request to first level cache. The storage controller also writes a copy 220 of the data to one or more PCIe memory devices by, for example, DMA, multicast etc.

FIG. 4 illustrates two use cases of a backend PCIe memory controller/device. However, it will be appreciated that the expansion of memory provided the backend memory controller will enable additional expanded functionality of the storage subsystem. Accordingly, the processes set forth in FIG. 4 are provided by way of example and not by way of limitation.

Instructions that perform the operations discussed above can be stored on storage media. The instructions can be retrieved and executed by a CPU/microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media. Additionally, for purposes of the disclosure, it will be noted that the term data as used herein includes a multiple bits, multiple bytes, multiple words, a block, a stripe, a file, a file segment, or other grouping of information. As used herein, the term data is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

Various components of the presented system include computing devices that include software that perform some of the actions described herein. These computing devices may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the devices may include various specialized units, circuits, software and interfaces for providing the functionality and features described herein. The processes, functionality and features described herein may be embodied in whole or in part in software and/or may be in the form of one or more of firmware, an application program, object code, machine code, an executable file, an applet, a COM object, a dynamic library (DLL), a dynamically loaded library (.so), a script, one or more subroutines, or an operating system component or service, and other forms of software. The hardware and software and their functions may be distributed.

A computing device as used herein refers to any device with a processor, memory and a storage device that may execute instructions such as software including, but not limited to, server computers. The computing devices may run an operating system, including, for example, versions of the Lustre, Linux, UNIX, MS-DOS, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. Th network interface may allow for communications according to various protocols and standards, including, for example, versions of SAS, Ethernet, INFINI-BAND network, Fibre Channel, and others.

While the inventions have been illustrated and described in the drawings and foregoing description, such illustration and description is to be considered as exemplary and not restrictive in character. Protection is desired for all changes and modifications that come within the spirit of the inventions. Those skilled in the art will appreciate variations of the above-described embodiments that fall within the scope of the inventions. As a result, the inventions are not limited to the specific examples and illustrations discussed above, but only by the following claims and their equivalents.

What is claimed:
1. A storage system, including:
a plurality of storage devices configurable as one of more logical units for providing data storage;
first and second storage controllers having a first front-end interface and a second front-end interface for receiving I/O requests from host systems, a first processor and a second processor, a first controller memory and a second controller memory, and a first back-end interface and a second back-end interface, respectively, wherein said first back-end interfaces and said second back-end interface are each interconnected to the plurality of storage devices for selectively transferring I/O requests to the storage devices;
a plurality of solid state drives (SSDs) connected to said first back-end interface of said first storage controller and connected to said second back-end interface of said second storage controller, wherein said plurality of SSDs define a second-level cache for said first and second storage controllers;
a backend memory controller connected to said first back-end interface of said first storage controller via a first PCIe connection and connected to said second back-end interface of said second storage controller via a second PCIe connection, wherein said memory controller is accessible by said first and second processors, said memory controller including:
a memory having:
a first portion that is memory-mapped to said first controller memory, wherein said first controller memory and said first portion of said memory of said backend memory controller use a common first address; and a second portion that is memory-mapped to said second controller memory, wherein said second controller memory and said second portion of said memory of said backend memory controller use a common second address.

2. The system of claim 1, wherein said memory of said backend memory controller stores data structures for said second level cache.

3. The system of claim 2, wherein each of said first and second processors is configured to demote data from a first level cache to said second level cache and store data structures for said data as stored in said second level cache to said memory of said backend memory controller.

4. The system of claim 2, wherein each of said first and second processors is configured to access said memory of said backend memory controller to search the data structures.

5. The system of claim 4, wherein upon identifying a data structure associated with a read request in said memory of said backend memory controller, each said processor is configured to retrieve data associated with the data structure from said second level cache in a Direct Memory Access (DMA) operation.

6. The system of claim 1, wherein said memory of said backend memory controller is byte addressable via load store operations.

7. The system of claim 1, wherein said memory of said backend memory controller is volatile memory, and said backend memory controller further comprises:
a non-volatile memory; and
an on-board power source, wherein upon power failure said backup power source powers said volatile memory, said non-volatile memory and a microprocessor or sequencer of said backend memory controller copy data from said volatile memory to said non-volatile memory.

8. The system of claim 1, wherein said backend memory controller is a first backend memory controller and said memory is a first memory, further comprising:
a second backend memory controller connected to said first back-end interface of said first storage controller via a third PCIe connection and connected to said second back-end interface of said second storage controller via a fourth PCIe connection, said second backend memory controller including:
a second memory having a first portion that is memory-mapped to said first controller memory and having a second portion that is memory-mapped to said second controller memory.

9. The system of claim 8, wherein each of said first and second processors is configured to:
copy data of received I/O requests to at least one of said first memory of said first backend memory controller and said second memory of said second backend memory controller.

10. A storage system, including:
a plurality of storage devices configurable as one of more logical units for providing data storage;
first and second storage controllers having a first front end interface and a second front-end interface for receiving I/O requests from host systems, a first processor and a second processor, a first controller memory and a second controller memory, and a first back-end interface and a second back-end interface, respectively, wherein said back-end interfaces are interconnected to the plurality of storage devices for selectively transferring I/O requests to the storage devices;
a backend memory controller connected to said first back-end interface of said first storage controller via a first PCIe connection and connected to said second back-end interface of said second storage controller via a second PCIe connection, wherein said memory controller is accessible by said first and second processors, said memory controller including a memory having:
a first portion that is memory-mapped to said first controller memory, wherein said first controller memory and said first portion of said memory of said backend memory controller use a common first address; and
a second portion that is memory-mapped to said second controller memory, wherein said second controller memory and said second portion of said memory of said backend memory controller use a common second address wherein said memory of said backend memory controller forms an expansion of said first controller memory and said second controller memory.

11. The system of claim 10, wherein each of said first and second processors is configured to, upon receiving an I/O write request, write a mirror copy of data associated with said I/O write request to said memory of said backend memory controller.

12. The system of claim 10, wherein said backend memory controller is a first backend memory controller, further comprising:
a second backend memory controller connected to said first back-end interface of said first storage controller via a third PCIe connection and connected to said second back-end interface of said second storage controller via a fourth PCIe connection, said second backend memory controller including:
a second memory having a first portion that is memory-mapped to said first controller memory and having a second portion that is memory-mapped to said second controller memory.

13. The system of claim 12, wherein each of said first and second processors is configured to, upon receiving an I/O write request, write a mirror copy of data associated with said I/O write request to said first and second memories of said first and second backend memory controllers.

14. The system of claim 10, wherein a portion of said plurality of storage devices comprise a plurality of SSDs, wherein said plurality of SSDs define a second-level cache for said first and second controllers.

15. The system of claim 14, wherein each of said first and second processors is configured to demote data from a first level cache to said second level cache and store data structures for said data as stored in said second level cache to said memory of said backend memory controller.

16. A method for use in a storage subsystem having first and second storage controllers connected to a plurality of storage devices, comprising:
connecting a PCIe memory device to backend PCIe interfaces of both of said first and second storage controllers;
memory mapping a first portion of a memory of said PCIe memory device to a first controller memory of said first storage controller, wherein said first portion of said memory of said PCIe memory device and said first controller memory use a common first address; and
memory mapping a second portion of said memory of said PCIe memory device to a second controller memory of said second storage controller, wherein said second portion of said memory of said PCIe memory device and said second controller memory use a common second address and wherein said memory of said PCIe memory device is byte accessibly by processors of said first and second storage controllers.

17. The method of claim 16, further comprising:
utilizing, by at least one of said first and second storage controllers, said memory of said PCIe memory device as first level cache.

18. The method of claim 16, further comprising:
upon at least one of said first and second storage controllers demoting data from a first level cache to a second level cache, storing data structures of said data as stored in said second level cache in said memory of said PCIe memory device.

19. The method of claim 18, further comprising:
upon one of said first and second storage controllers receiving a I/O read request, searching said memory of said PCIe memory device to identify data structures associated with data corresponding to said I/O read request stored in said second level cache.

20. The method of claim 16, further comprising:
upon one of said first and second storage controllers receiving a I/O write request, writing data associated with said request to a corresponding one of said first and second storage controller memories and writing said data to said memory of said PCIe memory device.

* * * * *